(12) United States Patent
Hutka et al.

(10) Patent No.: US 10,387,719 B2
(45) Date of Patent: Aug. 20, 2019

(54) BIOMETRIC BASED FALSE INPUT DETECTION FOR A WEARABLE COMPUTING DEVICE

(71) Applicant: DAQRI, LLC, Los Angeles, CA (US)

(72) Inventors: Stefanie A. Hutka, Los Angeles, CA (US); Lucas Kazansky, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 147 days.

(21) Appl. No.: 15/600,104

(22) Filed: May 19, 2017

(65) Prior Publication Data

US 2017/0337422 A1 Nov. 23, 2017

Related U.S. Application Data

(60) Provisional application No. 62/339,748, filed on May 20, 2016.

(51) Int. Cl.
*G06F 17/20* (2006.01)
*G06K 9/00* (2006.01)
(Continued)

(52) U.S. Cl.
CPC ......... *G06K 9/00335* (2013.01); *G06F 3/015* (2013.01); *G06F 3/017* (2013.01);
(Continued)

(58) Field of Classification Search
CPC ........ G06F 3/013; G06F 17/011; G06F 3/011; G02B 2027/0187; G06K 9/00335; G06K 3/017; G06K 9/00671
See application file for complete search history.

(56) References Cited

U.S. PATENT DOCUMENTS 4,109,145 A * 8/1978 Graf ...................... A61B 3/113
250/221
8,696,113 B2 * 4/2014 Lewis .................... G06F 3/011
345/8
(Continued)

OTHER PUBLICATIONS

Keller, Ingo, et al., "Readiness Potentials Preceding Spontaneous Motor Acts—Voluntary Vs Involuntary Control", Electroencephalography and clinical Neurophysiology, 1990, 76, (1990), 351-361.
(Continued)

*Primary Examiner* — Mohammed H Zuberi
(74) *Attorney, Agent, or Firm* — Schwegman Lundberg & Woessner, P.A.

(57) ABSTRACT

A wearable computing device includes various biometric sensors for recording biometric measurements of a user wearing the wearable computing device. The wearable computing device is further configured to interpret the biometric measurements as commands to be performed. The wearable computing device also includes modules and logic that determine whether the biometric measurements were voluntary or involuntary movements by the user, which indicate whether the user intended such biometric measurements to be input to the wearable computing device. Where the biometric measurements indicate that the user's movements and/or gestures were voluntary, the wearable computing device is configured to further classify and analyze the biometric measurements. This classification and analysis yields the different types of actions and objects the user was engaged in or acting on at the time the biometric measurements were obtained.

20 Claims, 7 Drawing Sheets

(51) Int. Cl.
*G06F 3/01* (2006.01)
*G06K 9/20* (2006.01)

(52) U.S. Cl.
CPC ..... *G06K 9/00597* (2013.01); *G06K 9/00671* (2013.01); *G06K 9/00684* (2013.01); *G06K 9/2018* (2013.01)

(56) References Cited

U.S. PATENT DOCUMENTS

| | | | | |
|---|---|---|---|---|
| 9,292,973 | B2* | 3/2016 | Bar-Zeev | G02B 27/017 |
| 9,323,325 | B2* | 4/2016 | Perez | G02B 27/017 |
| 9,342,610 | B2* | 5/2016 | Liu | G02B 27/017 |
| 9,423,612 | B2* | 8/2016 | Border | G06F 3/011 |
| 9,436,006 | B2* | 9/2016 | Border | G02B 27/0172 |
| 9,448,409 | B2* | 9/2016 | Border | G02B 27/0176 |
| 9,494,800 | B2* | 11/2016 | Border | G02B 27/0172 |
| 9,523,856 | B2* | 12/2016 | Osterhout | G02B 27/017 |
| 9,529,195 | B2* | 12/2016 | Osterhout | G02B 27/0172 |
| 9,532,715 | B2* | 1/2017 | Border | A61B 5/1171 |
| 9,645,396 | B2* | 5/2017 | Andes | G02B 27/017 |
| 9,651,784 | B2* | 5/2017 | Osterhout | G06F 3/03545 |
| 9,658,473 | B2* | 5/2017 | Lewis | G06F 3/013 |
| 9,684,172 | B2* | 6/2017 | Border | G02B 27/017 |
| 9,720,234 | B2* | 8/2017 | Border | G02B 27/0172 |
| 9,720,241 | B2* | 8/2017 | Osterhout | G06F 3/012 |
| 9,746,686 | B2* | 8/2017 | Haddick | G06T 7/80 |
| 9,753,288 | B2* | 9/2017 | Osterhout | G06F 3/03547 |
| 9,766,463 | B2* | 9/2017 | Border | G02B 27/0176 |
| 9,829,707 | B2* | 11/2017 | Border | G02B 27/0172 |
| 9,836,122 | B2* | 12/2017 | Border | G06F 3/013 |
| 9,952,664 | B2* | 4/2018 | Border | G06F 3/013 |
| 9,965,681 | B2* | 5/2018 | Border | G06K 9/00604 |
| 9,996,221 | B2* | 6/2018 | Ballard | H04W 76/10 |
| 10,037,084 | B2* | 7/2018 | Joo | G02B 27/0172 |
| 10,062,182 | B2* | 8/2018 | Haddick | G06T 11/001 |
| 2002/0044152 | A1* | 4/2002 | Abbott, III | G06T 11/00 345/629 |
| 2008/0062297 | A1* | 3/2008 | Sako | G02B 27/017 348/333.02 |
| 2010/0238161 | A1* | 9/2010 | Varga | G06T 17/05 345/419 |
| 2012/0068913 | A1* | 3/2012 | Bar-Zeev | G02B 26/026 345/8 |
| 2013/0219012 | A1* | 8/2013 | Suresh | G09G 5/14 709/217 |
| 2013/0241952 | A1* | 9/2013 | Richman | G06F 17/21 345/619 |
| 2014/0049452 | A1* | 2/2014 | Maltz | G06F 3/013 345/8 |
| 2014/0198189 | A1* | 7/2014 | Aronsson | H04N 13/383 348/51 |
| 2014/0247208 | A1* | 9/2014 | Henderek | G06F 3/0481 345/156 |
| 2014/0282220 | A1* | 9/2014 | Wantland | G06F 3/04845 715/782 |
| 2015/0128049 | A1* | 5/2015 | Block | G06F 3/1423 715/728 |
| 2015/0154868 | A1* | 6/2015 | Neuner | G01C 21/3685 340/932.2 |
| 2015/0293589 | A1* | 10/2015 | Zhou | G06K 9/00335 345/157 |
| 2015/0338926 | A1* | 11/2015 | Park | G06F 3/011 345/156 |
| 2016/0062457 | A1* | 3/2016 | Kobayashi | G06F 3/013 345/156 |
| 2016/0089980 | A1* | 3/2016 | Kurahashi | G06F 3/013 345/156 |
| 2016/0209648 | A1* | 7/2016 | Haddick | G02B 27/0093 |
| 2016/0246384 | A1* | 8/2016 | Mullins | G06F 3/017 |

OTHER PUBLICATIONS

Libet, Benjamin, et al., "Time of Conscious Intention to Act in Relation to Onset of Cerebral Activity (Readiness-Potential)", Brain (1983), 106, (1983), 623-642.

Libet, Benjamin, "Unconscious cerebral initiative and the role of conscious will in voluntary action", The Behavioral and Brain Sciences (1985) 8, (1985), 529-566.

* cited by examiner

BIOMETRIC BASED FALSE INPUT DETECTION FOR A WEARABLE COMPUTING DEVICE

CROSS-REFERENCE TO RELATED APPLICATIONS

This application claims the benefit of priority to U.S. patent application Ser. No. 62/339,748, titled "BIOMETRIC BASED FALSE INPUT DETECTION FOR A WEABLE COMPUTING DEVICE and filed May 20, 2016," the disclosure of which is hereby incorporated by reference in its entirety.

TECHNICAL FIELD

The subject matter disclosed herein generally relates to biometric based false input detection for a wearable computing device and, in particular, to determining whether a biometric based input provided via a wearable computing device should be executed given the environment in which the wearable computing device is located.

BACKGROUND

Augmented reality (AR) is a live direct or indirect view of a physical, real-world environment whose elements are augmented (or supplemented) by computer-generated sensory input such as sound, video, graphics or Global Positioning System (GPS) data. With the help of advanced AR technology (e.g., adding computer vision and object recognition) the information about the surrounding real world of the user becomes interactive. Device-generated (e.g., artificial) information about the environment and its objects can be overlaid on the real world.

Typically, a user uses a computing device to view the augmented reality. The computing device may be a wearable computing device used in a variety of environments. These environments may be noisy or have active objects and/or elements (e.g., cars, other people, advertising billboards, movie marquees, etc.) that draw the user's attention away from the computing device. Accordingly, when the user interacts with these active objects or elements, the computing device will typically interpret the user's interaction as a command. This response by the computing device often causes the computing device to perform a command and/or action that was unintended by the user. Thus, these conventional computing devices that leverage augmented reality can have difficulties when used in environments that have different objects and/or elements that demands the user's attention.

BRIEF DESCRIPTION OF THE DRAWINGS

Some embodiments are illustrated by way of example and not limited to the figures of the accompanying drawings.

DETAILED DESCRIPTION

Figure 1:
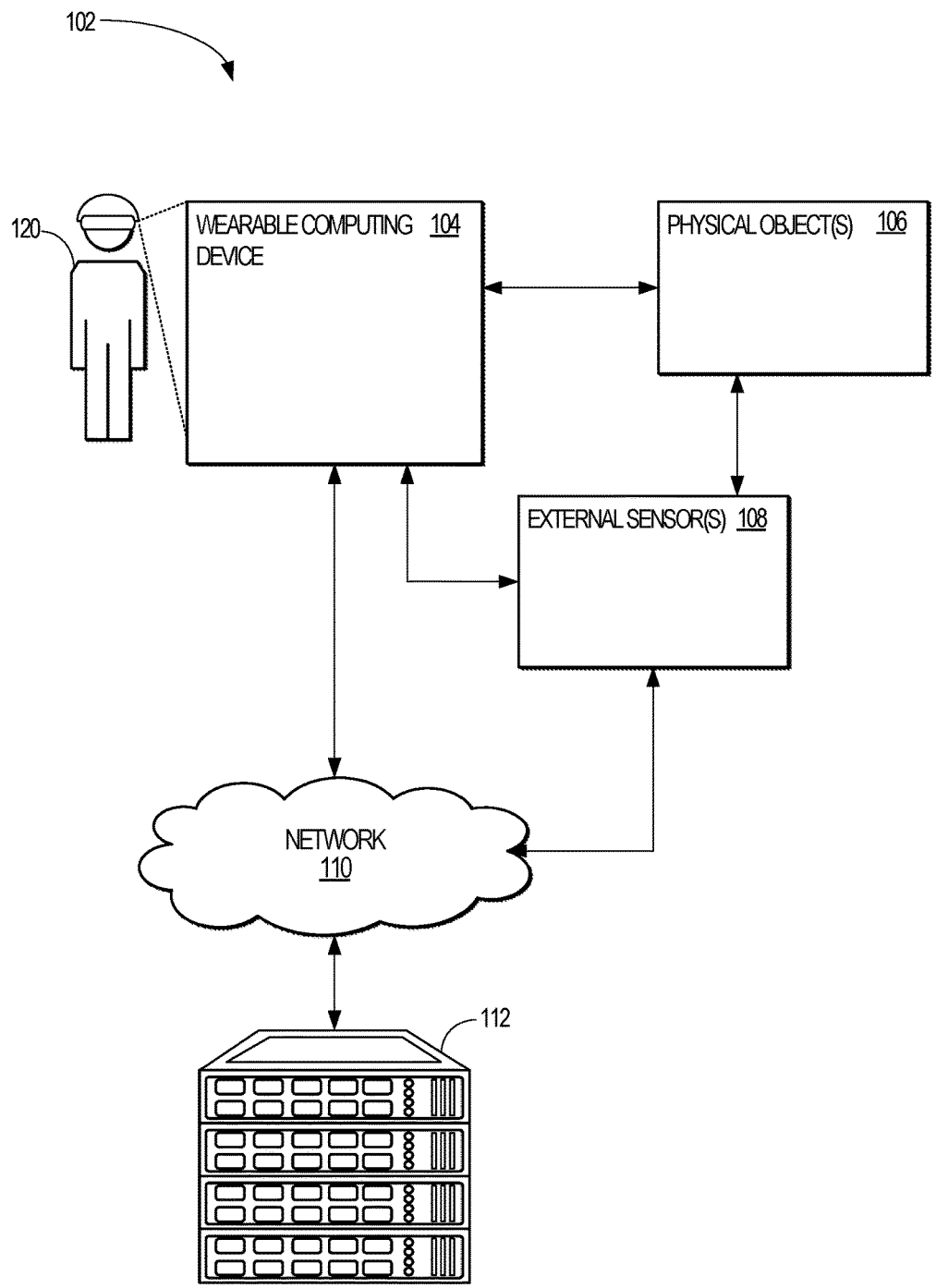
FIG. 1 is a block diagram illustrating an example of a network environment suitable for a wearable computing device, according to an example embodiment.

The disclosure provides for a wearable computing device that interprets whether a given input by the user of the wearable computing device is a command to be performed or a false input resulting from the user interacting with his or her environment. In one embodiment, the wearable computing device leverages different biometric measurements and/or metrics to determine whether an action performed by the user is a command or false input. For example, the wearable computing device may leverage a detected readiness potential in combination with other biometric measurements (e.g., eye tracking measurements, physical movements by the user, etc.). As known to one of ordinary skill in the art, readiness potential is a measure of activity in the motor cortex and supplementary motor area of the brain leading up to voluntary muscle movement. A user's readiness potential can be measured by one or more biometric sensors affixed to the wearable computing device, which can indicate whether a movement or action performed by the user was involuntary or voluntary. Where the movement or action is determined as voluntary, the readiness potential measurement can be combined with other biometric measurements to further refine the action or movement as an irrelevant or relevant action or movement. As discussed below with reference to FIG. 5, a matrix or array of different types of biometric measurements can be used to further refine the action or movement. In this manner, the disclosed wearable computing device is configured to distinguish between voluntary and involuntary actions and, where the action is voluntary, whether the action is intended as a command to be performed by the wearable computing device.

Accordingly, in one embodiment, the disclosed wearable computing device includes a machine-readable memory storing computer-executable instructions and at least one hardware processor in communication with the machine-readable memory that, when the computer-executable instructions are executed, configures the wearable computing device to perform a plurality of operations. The plurality of operations includes determining an environment type for an environment in which the wearable computing device is located, the environment type associated with an environment risk value, obtaining a plurality of biometric measurements from one or more biometric sensors communicatively coupled to the wearable computing device, and classifying the plurality biometric measurements into a plurality of categories, at least one category defining a characteristic of the obtained biometric measurements. The plurality of operations also includes determining a biometric input score based on the at least one category, comparing the determined biometric input score with the associated environment risk value, and in response to the comparison of the determined biometric input score and the associated environment risk value, identifying the plurality of biometric measurements as a false input to the wearable computing device.

In another embodiment of the wearable computing device, the plurality of operations further includes determining a readiness potential from the plurality of biometric measurements, comparing the determined readiness potential with a previously measured baseline readiness potential, and in response to the comparison of the determined readiness potential with the previously measured baseline readiness potential, determining that the plurality of biometric measurements were from voluntary movements of a user of the wearable computing device.

In a further embodiment of the wearable computing device, the environment type is determined by cross-referencing Global Positioning System (GPS) coordinates with a location associated with the environment type.

In yet another embodiment of the wearable computing device, determining the environment type includes activating at least one external camera to detect a plurality of objects, activating at least one audio sensor to detect one or more sounds, comparing the detected plurality of objects with at least one object threshold and the detected one or more sounds with at least one noise threshold, and in response to the comparisons with the at least one object threshold and the at least one noise threshold, determining the environment type.

In yet a further embodiment of the wearable computing device, each category of the plurality of categories is associated with a classification value, and the biometric input score is determined from the classification values associated with the plurality of categories.

In another embodiment of the wearable computing device, the plurality of operations further include determining whether the plurality of biometric measurements were the result of voluntary or involuntary movements by a user of the wearable computing device, in response to a determination that the plurality of biometric measurements were the result of voluntary movements, performing the classifying of the plurality biometric measurements into the plurality of categories.

In a further embodiment of the wearable computing device, the plurality of operations further includes identifying the plurality of biometric measurements as an input to be interpreted as a command performable by the wearable computing device in response to the comparison of the determined biometric input score and the associated environment risk value.

This disclosure also provides for a method for providing augmented reality images of an environment in which a wearable computing device is worn, the method comprising determining, by at least one hardware processor, an environment type for an environment in which the wearable computing device is located, the environment type associated with an environment risk value, obtaining, by one or more biometric sensors communicatively coupled to the wearable computing device, a plurality of biometric measurements, and classifying the plurality biometric measurements into a plurality of categories, at least one category defining a characteristic of the obtained biometric measurements. The method also includes determining a biometric input score based on the at least one category, comparing the determined biometric input score with the associated environment risk value, and in response to the comparison of the determined biometric input score and the associated environment risk value, identifying the plurality of biometric measurements as a false input to the wearable computing device.

In another embodiment of the method, the method includes determining a readiness potential from the plurality of biometric measurements, comparing the determined readiness potential with a previously measured baseline readiness potential, and in response to the comparison of the determined readiness potential with the previously measured baseline readiness potential, determining that the plurality of biometric measurements were from voluntary movements of a user of the wearable computing device.

In a further embodiment of the method, the environment type is determined by cross-referencing Global Positioning System (GPS) coordinates with a location associated with the environment type.

In yet another embodiment of the method, determining the environment type includes activating at least one external camera to detect a plurality of objects, activating at least one audio sensor to detect one or more sounds, comparing the detected plurality of objects with at least one object threshold and the detected one or more sounds with at least one noise threshold, and in response to the comparisons with the at least one object threshold and the at least one noise threshold, determining the environment type.

In yet a further embodiment of the method, each category of the plurality of categories is associated with a classification value, and the biometric input score is determined from the classification values associated with the plurality of categories.

In another embodiment of the method, the method includes determining whether the plurality of biometric measurements were the result of voluntary or involuntary movements by a user of the wearable computing device, and, in response to a determination that the plurality of biometric measurements were the result of voluntary movements, performing the classifying of the plurality biometric measurements into the plurality of categories.

In a further embodiment of the method, the method includes identifying the plurality of biometric measurements as an input to be interpreted as a command performable by the wearable computing device in response to the comparison of the determined biometric input score and the associated environment risk value.

This disclosure further provides for a machine-readable memory storing computer-executable instructions that, when executed by at least one hardware processor in communication with the machine-readable memory, configures a wearable computing device to perform a plurality of operations. The plurality of operations includes determining an environment type for an environment in which the wearable computing device is located, the environment type associated with an environment risk value, obtaining a plurality of biometric measurements from one or more biometric sensors communicatively coupled to the wearable computing device, and classifying the plurality biometric measurements into a plurality of categories, at least one category defining a characteristic of the obtained biometric measurements. The plurality of operations also includes determining a biometric input score based on the at least one category, comparing the determined biometric input score with the associated environment risk value, and, in response to the comparison of the determined biometric input score and the associated environment risk value, identifying the plurality of biometric measurements as a false input to the wearable computing device.

In another embodiment of the machine-readable memory, the plurality of operations further includes determining a readiness potential from the plurality of biometric measurements, comparing the determined readiness potential with a previously measured baseline readiness potential, and, in response to the comparison of the determined readiness potential with the previously measured baseline readiness potential, determining that the plurality of biometric measurements were from voluntary movements of a user of the wearable computing device.

In a further embodiment of the machine-readable memory, the environment type is determined by cross-referencing Global Positioning System (GPS) coordinates with a location associated with the environment type.

In yet another embodiment of the machine-readable memory, determining the environment type includes activating at least one external camera to detect a plurality of objects, activating at least one audio sensor to detect one or more sounds, comparing the detected plurality of objects with at least one object threshold and the detected one or more sounds with at least one noise threshold, and, in response to the comparisons with the at least one object threshold and the at least one noise threshold, determining the environment type.

In yet a further embodiment of the machine-readable memory, each category of the plurality of categories is associated with a classification value, and the biometric input score is determined from the classification values associated with the plurality of categories.

In another embodiment of the machine-readable memory, the plurality of operations further includes determining whether the plurality of biometric measurements were the result of voluntary or involuntary movements by a user of the wearable computing device, and, in response to a determination that the plurality of biometric measurements were the result of voluntary movements, performing the classifying of the plurality biometric measurements into the plurality of categories.

This disclosure provides for another a method for providing augmented reality images of an environment in which a wearable computing device is worn, the method including obtaining, by one or more biometric sensors communicatively coupled to a wearable computing device, a plurality of biometric measurements for a user of the wearable computing device, determining a readiness potential from the plurality of biometric measurements, comparing the determined readiness potential with a previously measured baseline readiness potential, in response to the comparison of the determined readiness potential with the previously measured baseline readiness potential, determining that the plurality of biometric measurements were from voluntary movements of a user of the wearable computing device, and, in response to the determination that the plurality of biometric measurements were from voluntary movements of the user, interpreting the plurality of biometric measurements as a command to be performed by the wearable computing device.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is a block diagram illustrating an example of a network environment 102 suitable for a wearable computing device 104, according to an example embodiment. The network environment 102 includes the wearable computing device 104 and a server 112 communicatively coupled to each other via a network 110. The wearable computing device 104 and the server 112 may each be implemented in a computer system, in whole or in part, as described below with respect to FIG. 5.

The server 112 may be part of a network-based system. For example, the network-based system may be or include a cloud-based server system that provides additional information, such as three-dimensional (3D) models or other virtual objects, to the wearable computing device 104.

The wearable computing device 104 may be implemented in various form factors. In one embodiment, the wearable computing device 104 is implemented as a helmet, which the user 120 wears on his or her head, and views objects (e.g., physical object(s) 106) through a display device, such as one or more lenses, affixed to the wearable computing device 104. In another embodiment, the wearable computing device 104 is implemented as a lens frame, where the display device is implemented as one or more lenses affixed thereto. In yet another embodiment, the wearable computing device 104 is implemented as a watch (e.g., a housing mounted or affixed to a wrist band), and the display device is implemented as a display (e.g., liquid crystal display (LCD) or light emitting diode (LED) display) affixed to the wearable computing device 104.

A user 120 may wear the wearable computing device 104 and view one or more physical object(s) 106 in a real world physical environment. The user 120 may be a human user (e.g., a human being), a machine user (e.g., a computer configured by a software program to interact with the wearable computing device 104), or any suitable combination thereof (e.g., a human assisted by a machine or a machine supervised by a human). The user 120 is not part of the network environment 102, but is associated with the wearable computing device 104. For example, the wearable computing device 104 may be a computing device with a camera and a transparent display. In another example embodiment, the wearable computing device 104 may be hand-held or may be removably mounted to the head of the user 120. In one example, the display device may include a screen that displays what is captured with a camera of the wearable computing device 104. In another example, the display may be transparent or semi-transparent, such as lenses of wearable computing glasses or the visor or a face shield of a helmet.

The user 120 may be a user of an augmented reality (AR) application executable by the wearable computing device 104 and/or the server 112. The AR application may provide the user 120 with an AR experience triggered by one or more identified objects (e.g., physical object(s) 106) in the physical environment. For example, the physical object(s) 106 may include identifiable objects such as a two-dimensional (2D) physical object (e.g., a picture), a 3D physical object (e.g., a factory machine), a location (e.g., at the bottom floor of a factory), or any references (e.g., perceived corners of walls or furniture) in the real-world physical environment. The AR application may include computer vision recognition to determine various features within the physical environment such as corners, objects, lines, letters, and other such features or combination of features.

In one embodiment, the objects in an image captured by the wearable computing device 104 are tracked and locally recognized using a local context recognition dataset or any other previously stored dataset of the AR application. The local context recognition dataset may include a library of virtual objects associated with real-world physical objects or references. In one embodiment, the wearable computing device 104 identifies feature points in an image of the physical object 106. The wearable computing device 104 may also identify tracking data related to the physical object 106 (e.g., GPS location of the wearable computing device 104, orientation, or distance to the physical object(s) 106). If the captured image is not recognized locally by the wearable computing device 104, the wearable computing device 104 can download additional information (e.g., 3D model or other augmented data) corresponding to the captured image, from a database of the server 112 over the network 110.

In another example embodiment, the physical object(s) 106 in the image is tracked and recognized remotely by the server 112 using a remote context recognition dataset or any other previously stored dataset of an AR application in the server 112. The remote context recognition dataset may include a library of virtual objects or augmented information associated with real-world physical objects or references.

The network environment 102 also includes one or more external sensors 108 that interact with the wearable computing device 104 and/or the server 112. The external sensors 108 may be associated with, coupled to, or related to the physical object(s) 106 to measure a location, status, and characteristics of the physical object(s) 106. Examples of measured readings may include but are not limited to weight, pressure, temperature, velocity, direction, position, intrinsic and extrinsic properties, acceleration, and dimensions. For example, external sensors 108 may be disposed throughout a factory floor to measure movement, pressure, orientation, and temperature. The external sensor(s) 108 can also be used to measure a location, status, and characteristics of the wearable computing device 104 and the user 120. The server 112 can compute readings from data generated by the external sensor(s) 108. The server 112 can generate virtual indicators such as vectors or colors based on data from external sensor(s) 108. Virtual indicators are then overlaid on top of a live image or a view of the physical object(s) 106 (e.g., displayed on the display device 114) in a line of sight of the user 120 to show data related to the physical object(s) 106. For example, the virtual indicators may include arrows with shapes and colors that change based on real-time data. Additionally and/or alternatively, the virtual indicators are rendered at the server 112 and streamed to the wearable computing device 104.

The external sensor(s) 108 may include one or more sensors used to track various characteristics of the wearable computing device 104 including, but not limited to, the location, movement, and orientation of the wearable computing device 104 externally without having to rely on sensors internal to the wearable computing device 104. The external senor(s) 108 may include optical sensors (e.g., a depth-enabled 3D camera), wireless sensors (e.g., Bluetooth, Wi-Fi), Global Positioning System (GPS) sensors, and audio sensors to determine the location of the user 120 wearing the wearable computing device 104, distance of the user 120 to the external sensor(s) 108 (e.g., sensors placed in corners of a venue or a room), the orientation of the wearable computing device 104 to track what the user 120 is looking at (e.g., direction at which a designated portion of the wearable computing device 104 is pointed, e.g., the front portion of the wearable computing device 104 is pointed towards a player on a tennis court).

Furthermore, data from the external sensor(s) 108 and internal sensors (not shown) in the wearable computing device 104 may be used for analytics data processing at the server 112 (or another server) for analysis on usage and how the user 120 is interacting with the physical object(s) 106 in the physical environment. Live data from other servers may also be used in the analytics data processing. For example, the analytics data may track at what locations (e.g., points or features) on the physical object(s) 106 or virtual object(s) (not shown) the user 120 has looked, how long the user 120 has looked at each location on the physical object(s) 106 or virtual object(s), how the user 120 wore the wearable computing device 104 when looking at the physical object(s) 106 or virtual object(s), which features of the virtual object(s) the user 120 interacted with (e.g., such as whether the user 120 engaged with the virtual object), and any suitable combination thereof. To enhance the interactivity with the physical object(s) 106 and/or virtual objects, the wearable computing device 104 receives a visualization content dataset related to the analytics data. The wearable computing device 104, via the display device 114, then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that facilitates communication between or among machines (e.g., server 110), databases, and devices (e.g., the wearable computing device 104 and the external sensor(s) 108). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
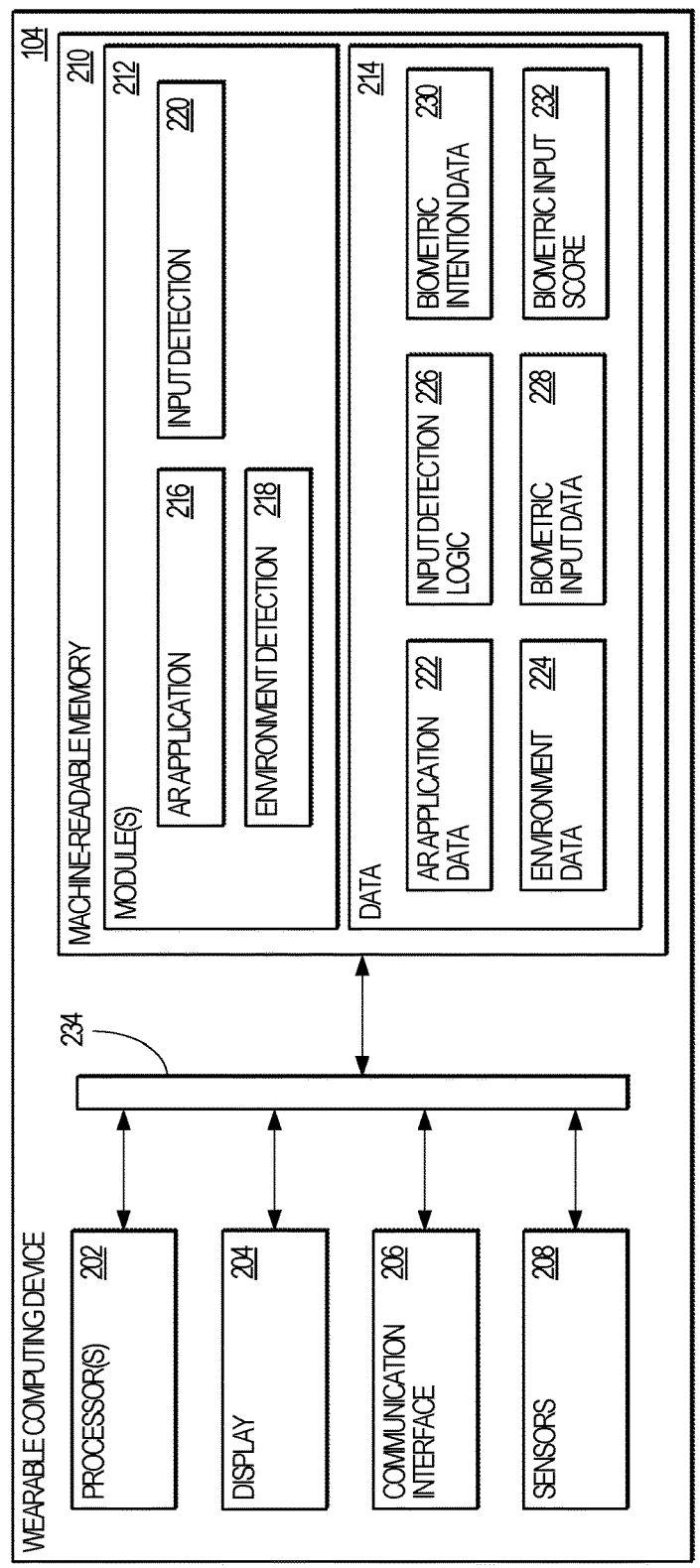
FIG. 2 is a block diagram of the wearable computing device of FIG. 1, according to an example embodiment

FIG. 2 is a block diagram of the wearable computing device 104 of FIG. 1, according to an example embodiment. The wearable computing device 104 includes various different types of hardware components. In one embodiment, the wearable computing device includes one or more processor(s) 202, a display 204, a communication interface 204, and one or more sensors 208. The wearable computing device 104 also includes a machine-readable memory 210. The various components 202-210 communicate via a communication bus 234.

The one or more processors 202 may be any type of commercially available processor, such as processors available from the Intel Corporation, Advanced Micro Devices, Qualcomm, Texas Instruments, or other such processors. Further still, the one or more processors 202 may include one or more special-purpose processors, such as a Field-Programmable Gate Array (FPGA) or an Application Specific Integrated Circuit (ASIC). The one or more processors 202 may also include programmable logic or circuitry that is temporarily configured by software to perform certain operations. Thus, once configured by such software, the one or more processors 202 become specific machines (or specific components of a machine) uniquely tailored to perform the configured functions and are no longer general-purpose processors.

The display 204 may include a display surface or lens configured to display AR content (e.g., images, video) generated by the one or more processor(s) 202. In one embodiment, the display 204 is made of a transparent material (e.g., glass, plastic, acrylic, etc.) so that the user 120 can see through the display 204. In another embodiment, the display 204 is made of several layers of a transparent material, which creates a diffraction grating within the display 204 such that images displayed on the display 204 appear holographic. The processor(s) 202 are configured to display a user interface on the display 204 so that the user 120 can interact with the wearable computing device 104.

The communication interface 206 is configured to facilitate communications between the wearable computing device 104, the user 120 and the external sensor(s) 108. The communication interface 206 may include one or more wired communication interfaces (e.g., Universal Serial Bus (USB), an $I^2C$ bus, an RS-232 interface, an RS-485 interface, etc.), one or more wireless transceivers, such as a Bluetooth® transceiver, a Near Field Communication (NFC) transceiver, an 802.11x transceiver, a 3G (e.g., a GSM and/or CDMA) transceiver, a 4G (e.g., LTE and/or Mobile WiMAX) transceiver, or combinations of wired and wireless interfaces and transceivers. In one embodiment, the communication interface 206 interacts with the sensors 208 to provide input to the wearable computing device 104. In this embodiment, the user 120 may engage in gestures, eye movements, speech, or other physical activities that the wearable computing device 104 interprets as input (e.g., via the AR application 214 and/or input detection module 218).

However, every movement and/or gesture performed by the user 120 may not necessarily be an input for the wearable computing device 104. As discussed below with reference to FIGS. 4A-4B, the wearable computing device 104 is configured to determine whether such movements and/or gestures are, in fact, inputs corresponding to a command that the wearable computing device 104 is to perform.

To detect the movements of the user 120, the wearable computing device 104, and/or other objects in the environment, the wearable computing device 104 includes one or more sensors 208. The sensors 208 may generate internal tracking data of the wearable computing device 104 to determine a position and/or an orientation of the wearable computing device 104. In addition, the sensors 208 cooperatively operate so as to assist the wearable computing device 104 in determining whether an action performed by the user 120 was intended to be a command performable by the wearable computing device 104.

The position and the orientation of the wearable computing device 104 may be used to identify real-world objects in a field of view of the wearable computing device 104. For example, a virtual object may be rendered and displayed in the display 204 when the sensors 208 indicate that the wearable computing device 104 is oriented towards a real-world object (e.g., when the user 120 looks at one or more physical object(s) 106) or in a particular direction (e.g., when the user 120 tilts his head to watch his wrist).

In addition, the position and/or orientation of the wearable computing device 104 may signal whether the user 120 intends a given physiological action (e.g., a gesture, eye movement, eye gaze, etc.) to be a command for the wearable computing device 104. For example, the The wearable computing device 104 may display a virtual object in response to a determined geographic location of the wearable computing device 104. For example, a set of virtual objects may be accessible when the user 120 of the wearable computing device 104 is located in a particular building. In another example, virtual objects, including sensitive material, may be accessible when the user 120 of the wearable computing device 104 is located within a predefined area associated with the sensitive material and the user 120 is authenticated. Different levels of content of the virtual objects may be accessible based on a credential level of the user 120. For example, a user who is an executive of a company may have access to more information or content in the virtual objects than a manager at the same company. The sensors 208 may be used to authenticate the user 120 prior to providing the user 120 with access to the sensitive material (e.g., information displayed in as a virtual object such as a virtual dialog box in a transparent display). Authentication may be achieved via a variety of methods such as providing a password or an authentication token, or using sensors 208 to determine biometric data unique to the user 120.

Figure 3:
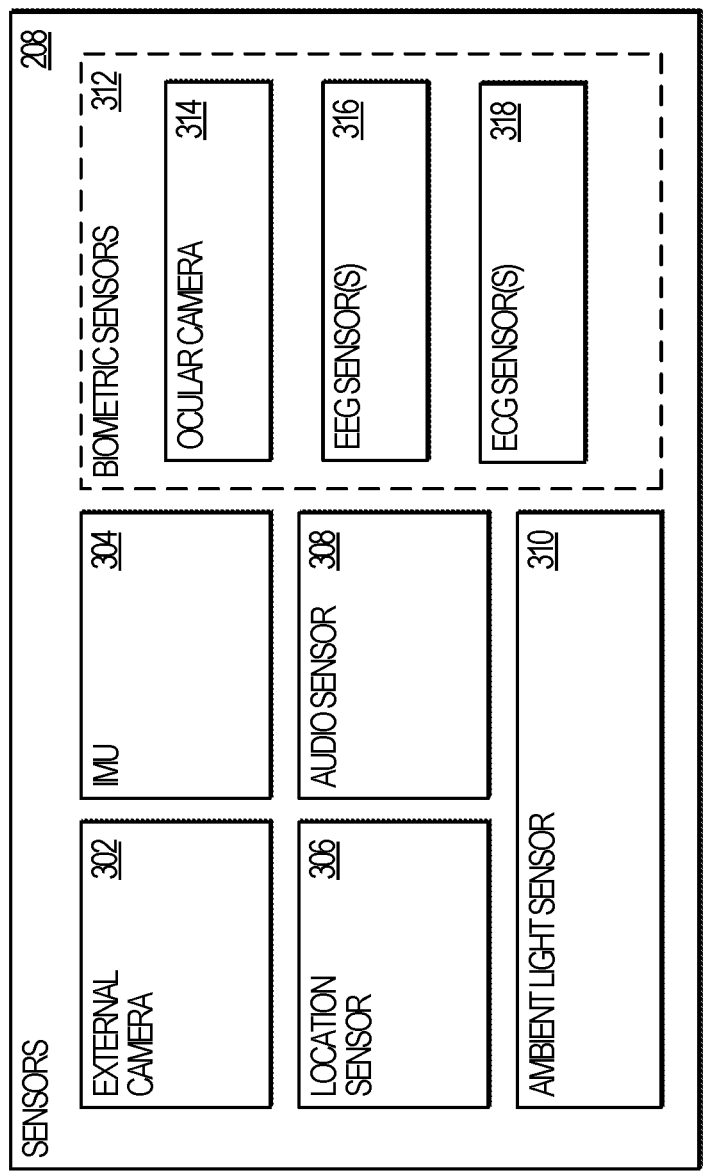
FIG. 3 is a block diagram illustrating different types of sensors used by the wearable computing device of FIG. 1, according to an example embodiment.

FIG. 3 is a block diagram illustrating different types of sensors 208 used by the wearable computing device 104 of FIG. 1, according to an example embodiment. For example, the sensors 208 may include an external camera 302, an inertial measurement unit (IMU) 304, a location sensor 306, an audio sensor 308, an ambient light sensor 310, and one or more biometric sensors 312. One of ordinary skill in the art will appreciate that the sensors illustrated in FIG. 3 are examples, and that different types and/or combinations of sensors may be employed in the wearable computing device 104.

The external camera 302 includes an optical sensor(s) (e.g., camera) configured to capture images across various spectrums. For example, the external camera 302 may include an infrared camera or a full-spectrum camera. The external camera 302 may include a rear-facing camera(s) and a front-facing camera(s) disposed in the wearable computing device 104. The front-facing camera(s) may be used to capture a front field of view of the wearable computing device 104 while the rear-facing camera(s) may be used to capture a rear field of view of the wearable computing device 104. The pictures captured with the front- and rear-facing cameras may be combined to recreate a 360-degree view of the physical environment around the wearable computing device 104.

The IMU 304 may include a gyroscope and an inertial motion sensor to determine an orientation and/or movement of the wearable computing device 104. For example, the IMU 304 may measure the velocity, orientation, and gravitational forces on the wearable computing device 104. The IMU 304 may also measure acceleration using an accelerometer and changes in angular rotation using a gyroscope.

The location sensor 306 may determine a geolocation of the wearable computing device 104 using a variety of techniques such as near field communication (NFC), the Global Positioning System (GPS), Bluetooth®, Wi-Fi®, and other such wireless technologies or combination of wireless technologies. For example, the location sensor 306 may generate geographic coordinates and/or an elevation of the wearable computing device 104.

The audio sensor 308 may include one or more sensors configured to detect sound, such as a dynamic microphone, condenser microphone, ribbon microphone, carbon microphone, and other such sound sensors or combinations thereof. For example, the microphone may be used to record a voice command from the user (e.g., user 120) of the wearable computing device 104. In other examples, the microphone may be used to measure an ambient noise (e.g., measure intensity of the background noise, identify specific type of noises such as explosions or gunshot noises).

The ambient light sensor 310 is configured to determine an ambient light intensity around the wearable computing device 104. For example, the ambient light sensor 314 measures the ambient light in a room in which the wearable computing device 104 is located. Examples of the ambient light sensor 310 include, but are not limited to, the ambient light sensors available from ams AG, located in Oberpremstätten, Austria.

The biometric sensors 312 include sensors configured to measure biometric data of the user 120 of the wearable computing device 104. In one example embodiment, the biometric sensors 312 include an ocular camera 314, one or more electroencephalogram (EEG) sensors 316, and one or more electrocardiogram (ECG) sensors 318. One of ordinary skill in the art will appreciate that the biometric sensors 312 illustrated in FIG. 3 are examples, and that different types and/or combinations of biometric sensors 312 may be employed in the wearable computing device 104.

The biometric sensors 312 may be affixed to different parts and/or surfaces of the wearable computing device 104 depending upon its implementation. For example, where the wearable computing device 104 is implemented as a head-mounted device, one or more of the biometric sensors 312 may be disposed within an interior surface of the wearable computing device 104 such that the one or more biometric sensors 312 are in contact with the skin of the user's 120 head (e.g., the forehead). As another example, where the wearable computing device 104 is implemented as a wrist-mounted device (e.g., a watch), one or more of the biometric sensors 312 may be disposed within, or in contact with, an exterior surface of the wearable computing device 104 such that the one or more biometric sensors 312 are also in contact with the skin of one of the user's 120 limbs (e.g., a wrist of a forearm). In either examples, the one or more biometric sensors 312 are arranged or disposed within the wearable computing device 104 such that it records physiological signals from the user 120.

One example of a biometric sensor 312 is an ocular camera 314. The ocular camera 314 may include an infrared (IR) camera configured to capture an image of a retina of the user 120. The IR camera may be used to perform a retinal scan to map unique patterns of the retina of the user 120. Blood vessels within the retina absorb light more readily than the surrounding tissue in the retina and therefore can be identified with IR lighting. The IR camera may cast a beam of IR light into the user's eye as the user 120 looks through the display 204 (e.g., lenses) towards virtual objects rendered in the display 204. The beam of IR light traces a path on the retina of the user 120. Because retinal blood vessels absorb more of the IR light than the rest of the eye, the amount of reflection varies during the retinal scan. The pattern of variations may be used as a biometric data unique to the user 120.

Alternatively and/or additionally, the ocular camera 314 may be a camera configured to capture an image of an iris in the eye of the user 120. In response to the amount of light entering the eye, muscles attached to the iris expand or contract the aperture at the center of the iris, known as the pupil. The expansion and contraction of the pupil depends on the amount of ambient light. The ocular camera 314 may use iris recognition as a method for biometric identification. The complex pattern on the iris of the eye of the user 120 is unique and can be used to identify the user 120. The ocular camera 314 may cast infrared light to acquire images of detailed structures of the iris of the eye of the user 120. Biometric algorithms may be applied to the image of the detailed structures of the iris to identify the user 120.

In another example embodiment, the ocular camera 306 includes an IR pupil dimension sensor that is pointed at an eye of the user 102 to measure the size of the pupil of the user 102. The IR pupil dimension sensor may sample the size of the pupil (e.g., using an IR camera) on a periodic basis or based on predefined triggered events (e.g., the user 102 walks into a different room, sudden changes in the ambient light, or the like).

Further still, the ocular camera 314 may be configured to determine the direction in which the eye of the user 120 is looking. This eye tracking feature may facilitate the user's interaction with a graphical user interface displayed on the display 204. In one example embodiment, the ocular camera 314 implements one or more eye tracking products, such as the eye tracking products available from SensoMotoric Instruments GmBH, which is located in Teltow, Germany The one or more EEG sensor(s) 316 are configured to measure electrical activity of the brain of the user 120. In one embodiment, the one or more EEG sensor(s) 316 are affixed to one or more surfaces of the wearable computing device 104, such that the one or more EEG sensor(s) 316 come into contact with the skin of the user 120 when the wearable computing device 104 is worn. The one or more EEG sensor(s) 316 may also measure the electrical activity and wave patterns through different bands of frequency (e.g., Delta, Theta, Alpha, Beta, Gamma, Mu).

The one or more EEG sensor(s) 316 are further configured to provide an output of the measured electrical activity of the user 120, which may indicate the user's readiness potential and/or one or more event-related potentials. In one embodiment, the wearable computing device 104 is calibrated to the electrical activity of the user 120, such that one or more baseline measurements are established that define the user's readiness potential. The baseline measurements may also define various event-related potentials specific to the user 120. Further still, these baseline measurements may be established for a variety of circumstances in which the user 120 is engaged with the wearable computing device 104 or while the user 120 is interacting with his or her environment while the wearable computing device 104 is being worn. Additionally and/or alternatively, the baseline measurements may include one or more default measurements derived from empirical research. By establishing such baseline measurements, the wearable computing device 104 can be configured to distinguish between voluntary and involuntary movements, as discussed in Keller, et al., *Readiness Potentials Preceding Spontaneous Motor Acts: Voluntary vs. Involuntary Control,* 76 Electroencephalography and Clinical Neurophysiology 351 (1990), which is incorporated by reference in its entirety. Additional techniques for measuring and identifying readiness potential is also explained in Benjamin Libet, *Unconscious Cerebral Initiative and the Role of Conscious Will in Voluntary Action,* 8 The Behavioral and Brain Sciences 529 (1985), and Libet et al., *Time of Conscious Intention to Act in Relation to Onset of Cerebral Activity (Readiness-Potential): The Unconscious Initiation of a Freely Voluntary Act,* 106 Brain 623 (1983), both of which are also incorporated by reference in their entirety.

These baseline measurements may be stored at the server 112 (e.g., the wearable computing device 104 communicates such measurements to the server 112 via the network 110), on the wearable computing device 104 itself (e.g., by being stored in the machine-readable memory 206), or a combination of both local storage and remote storage. During operation of the wearable computing device 104, the measured electrical activity of the user 120 may be compared with the one or more previously stored baseline measurements to determine whether the measured electrical activity corresponds to one or more of the baseline measurements and/or one or more event-related potentials. Should the wearable computing device 104 determine that the measured electrical activity corresponds to one or more of the baseline measurements (e.g., that the user's 120 readiness potential has been detected), the wearable computing device 104 then analyzes other biometric measurements to determine what type of action the user 120 has performed.

The one or more ECG sensor(s) 318 are configured to measure the heart rate of the user 120. In one embodiment, the one or more ECG sensor(s) 310 include one or more electrodes that measure the cardiac rhythm of the user 120. In addition, the one or more EEG sensor(s) 316 and the one or more ECG sensor(s) 318 may be combined into a same set of electrodes to measure both brain electrical activity and heart rate. The set of electrodes may be disposed one or more surfaces of the wearable computing device 104 so that the set of electrodes comes into contact with the skin of the user 120 when the user 120 wears the wearable computing device 104.

Referring back to FIG. 2, the machine-readable memory 210 includes various modules 212 and data 214 for implementing the features of the wearable computing device 104. The machine-readable memory 210 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single medium or multiple media (e.g., a centralized or distributed database, or associated caches and servers) able to store the modules 212 and the data 214. Accordingly, the machine-readable memory 210 may be implemented as a single storage apparatus or device, or, alternatively and/or additionally, as "cloud-based" storage systems or storage networks that include multiple storage apparatus or devices. As shown in FIG. 2, the machine-readable memory 210 excludes signals per se.

In one embodiment, the modules 212 are written in a computer-programming and/or scripting language. Examples of such languages include, but are not limited to, C, C++, C#, Java, JavaScript, Perl, Python, Ruby, or any other computer programming and/or scripting language now known or later developed.

The modules 212 include one or more modules 216-220 that implement the features of the wearable computing device 104. In one embodiment, the modules 212 include an AR application 216, an environment detection module 218, and an input detection module 220. The data 214 includes one or more different sets of data 222-232 used by, or in support of, the modules 212. In one embodiment, the data 214 includes AR application data 222, environment data 224, input detection logic 226, biometric input data 228, biometric intention data 230, and a biometric input score 232.

The AR application 216 is configured to provide the user 120 with an AR experience triggered by one or more of the physical object(s) 106 in the user's 120 environment. Accordingly, the machine-readable memory 210 also stores AR application data 222 which provides the resources (e.g., sounds, images, text, and other such audiovisual content) used by the AR application 216. In response to detecting and/or identifying physical object(s) 106 in the user's 120 environment, the AR application 216 generates audiovisual content (e.g., represented by the AR application data 222) that is displayed on the display 204. To detect and/or identify the physical object(s) 106, the AR application 216 may employ various object recognition algorithms and/or image recognition algorithms.

The AR application 216 may further generate and/or display interactive audiovisual content on the display 204. In one embodiment, the AR application 214 generates an interactive graphical user interface that the user 120 may use to interact with the AR application 216 and/or control various functions of the wearable computing device 104. In addition, the wearable computing device 104 may translate physical movements and/or gestures, performed by the user 120, as input for the graphical user interface. However, as discussed above, some physical movements and/or gestures may be movements and/or gestures that the user 120 does not intend to be input for the graphical user interface or the AR application 214. Such inputs may be ignored and/or cancelled by the wearable computing device 104 in response to a determination of the whether the movement and/or action was intended to be performed and the type of environment in which the movement and/or action was performed.

As the wearable computing device 104 is intended to be worn by the user 120, the wearable computing device 104 may be worn in a variety of environments. As one of ordinary skill in the art will appreciate, some environments are busier or nosier than other environments. For example, an empty warehouse room is less busy than a street intersection. One would expect that the user 120 engages in more movements/actions in a busy environment and less movements/actions in a less busy environment. In other words, it is expected that there will be more false inputs to the wearable computing device 104 in certain environments where the user 120 is expected to engage in a moderate degree of physical activity. Thus, the wearable computing device 104 is configured to account for the user's environment in determining whether a given gesture or movement is intended to be a command to the wearable computing device 104.

In one embodiment, the wearable computing device 104 includes an environment detection module 218 configured to determine the type of environment in which the wearable computing device 104 is located. The environment detection module 218 may be configured to distinguish between different types of environments and assign a corresponding environment risk value based on the type of detected environment. In one embodiment, the environment detection module 218 is configured to distinguish between three different types of environments: a high-risk environment, which is assigned an environment risk value of 20; a medium-risk environment, which is assigned an environment risk value of 15; and a low-risk environment, which is assigned an environment risk value of 10. The environment risk value assigned to the detected environment type may be stored as the environment data 224.

While the foregoing example identifies three different types of environments, one of ordinary skill in the art will appreciate that additional or different types of environments can be defined depending on the level of desired granularity in identifying environment types. Thus, the environment data 224 may include multiple environments types (e.g., five environment types, 10 environments types, etc.), where each environment type has a corresponding environment risk value. In this manner, the wearable computing device 104 can be configured to accommodate many different types of environments and not just the three types described in the example above.

To determine the type of environment in which the wearable computing device 104 is located, the environment detection module 218 may leverage one or more of the sensors 208. For example, and with reference to FIG. 3, the environment detection module 218 may activate the location sensor 306 to determine the location of the wearable computing device 104. In turn, the location sensor 306 may provide a set of coordinates (e.g., GPS coordinates) to the environment detection module 218. The environment detection module 218 may then reference the environment data 224 with the provided set of coordinates to determine the environment type where the wearable computing device 104 is located. In this embodiment, the environment data 224 may include a lookup table or other reference data structure where the environment detection module 218 can cross reference provided sets of coordinates with the corresponding environment type. Additionally and/or alternatively, the environment detection module 218 may communicate the provided set of coordinates to the server 112, which in turn, communicates the environment type to the environment detection module 218. In yet another additional and/or alternative implementation, the environment detection module 218 may leverage one or more of the sensors 208 to identify one or more beacons within the environment of the wearable computing device 104, where the environment detection module 218 uses one or more triangulation techniques to identify the location of the wearable computing device 104. Using the determined environments type, the environment detection module 218 then obtains the corresponding environment risk value.

The environment detection module 218 may also leverage one or more of the other sensors 208 in addition to, or alternatively from, the location sensor 306 and determining environment type where the wearable computing device 104 is located. In one embodiment, the environment detection module 218 activates the external camera 302 and the audio sensor 308. In this embodiment, it is assumed that busier or riskier environments will have more objects and/or have more noise (e.g., louder noises and/or different types of noises). Accordingly, the environment data 224 includes a set of detected object thresholds corresponding to the external camera 302 and a set of noise thresholds corresponding to the audio sensor 308.

With regard to the detected object thresholds, a detected object threshold corresponds to the number of identified objects captured by the external camera 302. Thus, a first detected object threshold may correspond to 10 objects, a second detected object threshold may correspond to 50 objects, and a third detected object threshold may correspond to 100 objects. In this example, the detected object threshold and the environment risk value have a direct relationship; thus, as the number of detected objects increases so does the corresponding environment risk value.

The noise thresholds are configured similarly to the detected object thresholds. In one embodiment, the noise thresholds are measured in decibels (dB) and the noise thresholds may include multiple noise thresholds to account for different types of noisy or quiet environments. As with the detected object thresholds, the noise thresholds may also be directly related to the environment risk value such that, as the sound detected by the audio sensor 308 becomes louder (e.g., an increase in the measured decibels), the environment risk value also increases. The amount of increase in the environment risk value may be a predetermined amount such that the environment risk value linearly increases with the detected object threshold and or noise threshold or the environment risk value may increase by other amounts, such as by an exponential or logarithmic amount.

Additionally and/or alternatively, the environment risk value may be associated with a task being performed by the user 120 of the wearable computing device 104. In this manner, tasks assigned to the user 120 may be associated with corresponding risk values, where the motions and/or gestures by the user 120 are interpreted as input to the wearable computing device 104 depending on the assigned task.

The wearable computing device 104 also detects the motions and/or activities of the user 120 to determine whether such motions and/or activities correspond to an intended input by the user 120. Accordingly, in one embodiment, the wearable computing device 104 includes an input detection module 220 configured to interpret and evaluate the user's motions, gestures, and other such movements. In interpreting and evaluating these movements, the wearable computing device 104 also includes input detection logic 226, which instructs the input detection module 220 as to how different types of inputs are to be processed. The input detection logic 226 is discussed further with reference to FIG. 5 below.

The input detection module 220 is also configured to determine whether a given set of inputs (e.g., one or more motions and/or gestures) is intended as a command to the wearable computing device 104. In this regard, input detection module 220 references the biometric input data 228, which includes biometric measurements obtained by the various sensors 208. The input detection module 220 evaluates the biometric input data 228 according to the input detection logic 226 to classify the retrieved biometric input data 228 into one or more categories. As discussed with reference to FIG. 5, such categories include, but are not limited to, whether the motions and/or gestures by the user 120 were voluntary or involuntary, whether the movement and/or gesture was an automatic or non-automatic, whether the user 120 was viewing an animate or inanimate object when the motion and/or gesture was made, and other such categories which are described in more detail below. The classified biometric input data 228 is then stored as the biometric intention data 230.

The input detection module 220 then assigns corresponding classification values to the classified biometric input. The classification values assignable to the classified biometric input data may be predetermined and/or programmed by an administrator or operator of the wearable computing device 104. In one embodiment, the classification values are stored on the wearable computing device 104 as part of the biometric intention data 230. Alternatively and/or additionally, the classification values may be stored on the server 112, which the wearable computing device 104 retrieves via the communication interface 206. The input detection module 220 then determines a biometric input score 232 according to the classification values assigned to the classified biometric input data.

The biometric input score 232 serves as a basis by which the input detection module 220 determines whether a given gesture or motion by the user 120 is to be interpreted as a command to the wearable computing device 104. In one embodiment, the biometric input score 232 is compared with the environment risk value previously determined by the environment detection module 218. For example, where the biometric input score 232 is equal to or greater than the environment risk value, the input detection module 220 may determine that a command was not intended, and therefore, ignores the gestures and/or movements by the user 120. Conversely, and in this example, where the biometric input score 232 does not exceed the environment risk value, the input detection module 220 determines that command was intended and passes the biometric input data 228 to the AR application 216 for interpreting the biometric input data 228 as an intended command. As an alternative example, where the biometric input score 232 is equal to or greater than the environment risk value, the input detection module 220 may determine that command was intended.

Figure 4A:
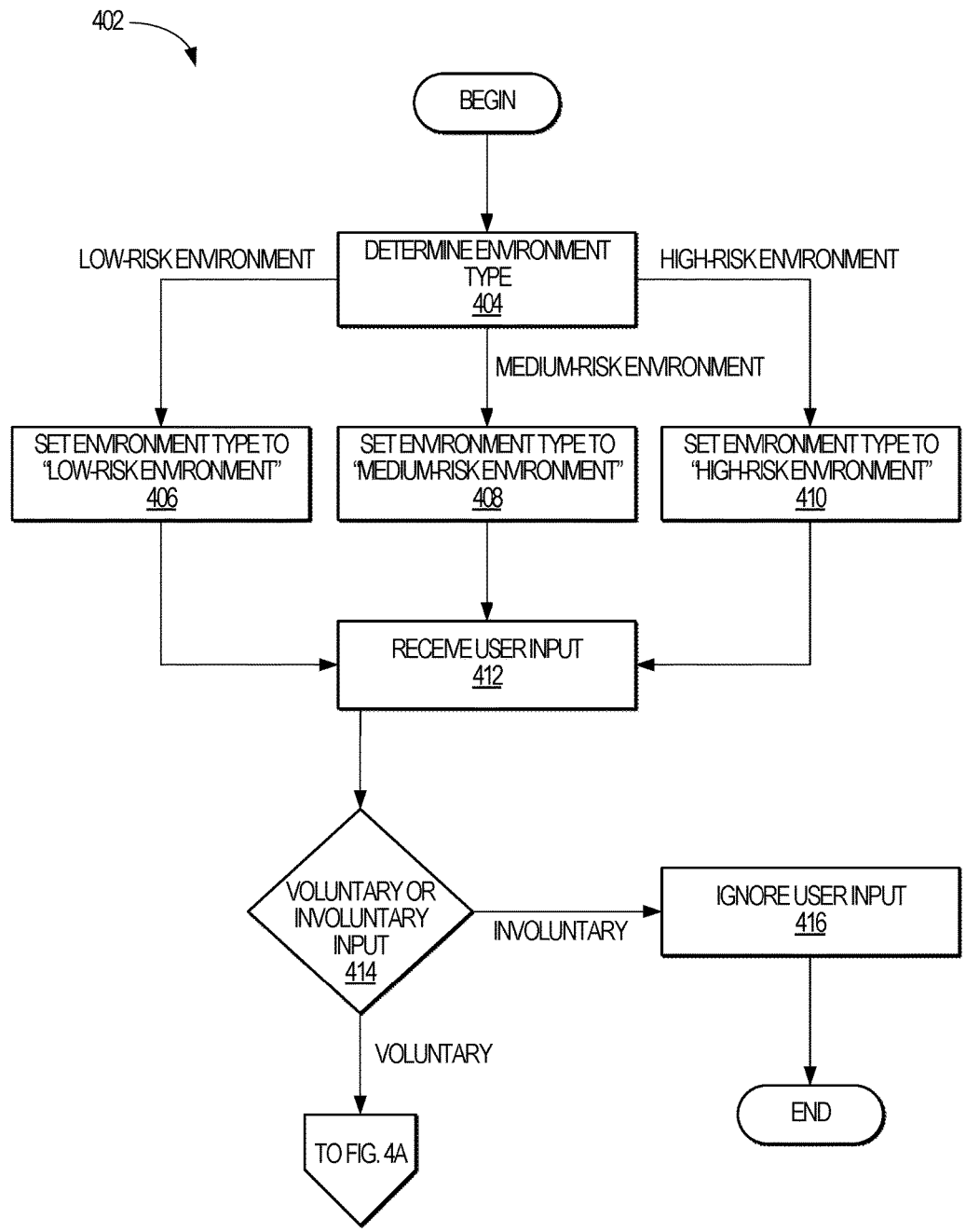
FIGS. 4A-4B illustrate a method, according to an example embodiment, implemented by the wearable computing device of FIG. 1 for determining whether a given input is a false input.
Figure 4B:
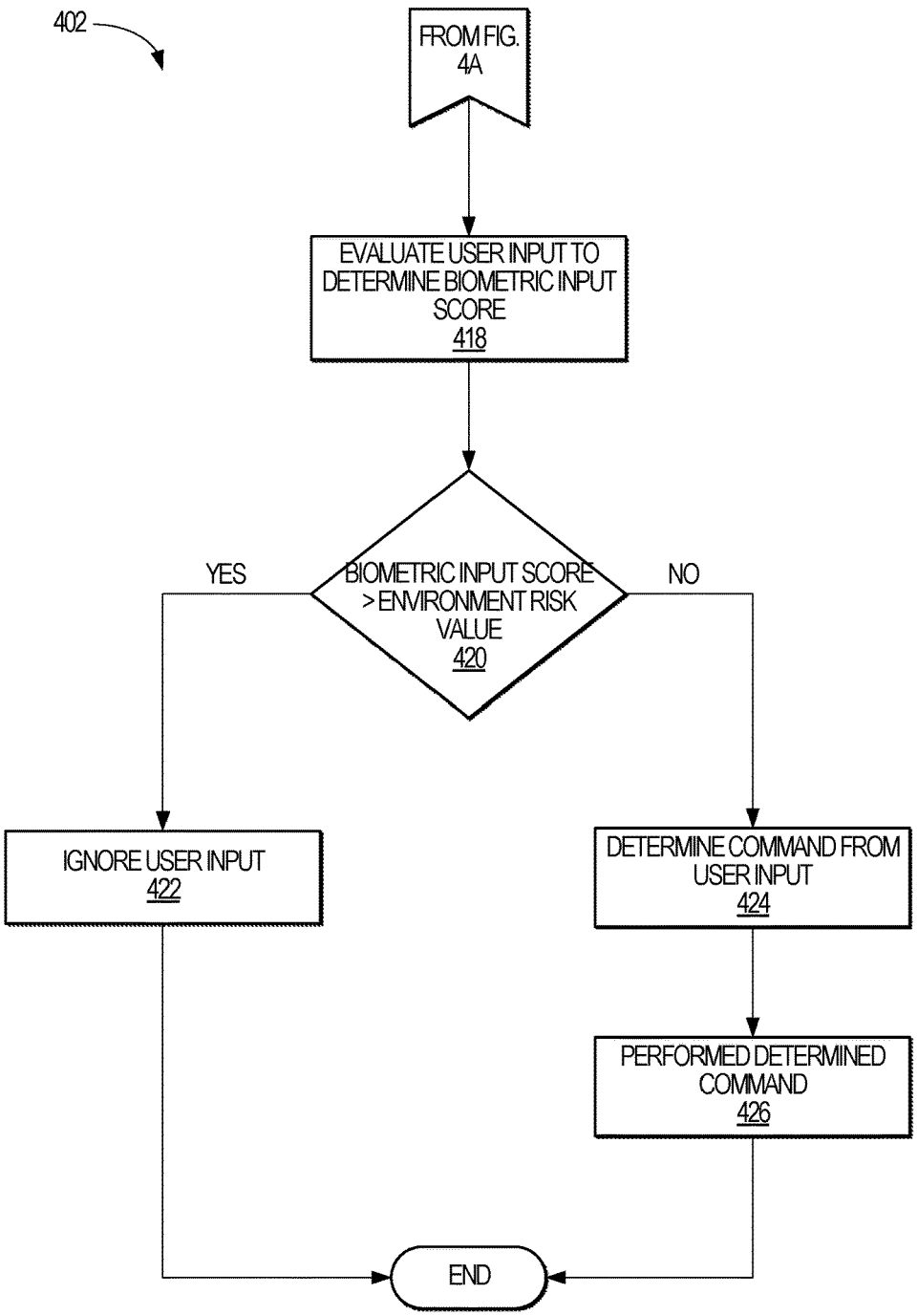

FIGS. 4A-4B illustrate a method 402, according to an example embodiment, implemented by the wearable computing device 104 of FIG. 1 for determining whether a given input is a false input. The method may be implemented by one or more components of the wearable computing device 104 and is discussed by way of reference thereto.

Referring initially to FIG. 4A, the environment detection module 218 determines an environment type for the wearable computing device 104 is located (Operation 404). As explained above, the environment detection module 218 may use one or more of the sensors 208 in determining this environment type. Examples of environment types include, but are not limited to, a high-risk environment, a medium-risk environment, and a low-risk environment. Other types of environments may also be defined depending upon the level of granularity in determining environment types desired by the user and/or administrator of the wearable computing device 104.

In one embodiment, the environment detection module 218 determines the environment type using the location sensor 306, such as by cross-referencing GPS coordinates obtained by the location sensor 306 with environment types stored either at the server 112 or as part of the environment data 224 stored by the wearable computing device 104. Additionally and/or alternatively, the environment detection module 218 determines the environment type using the external camera 302 and/or the audio sensor 308 and comparing the measurements obtained by these sensors with preconfigured thresholds (e.g., the environment data 224). As discussed above, such thresholds may include one or more detected object thresholds and/or one or more noise thresholds. Each of the thresholds (e.g., the various detected object thresholds and the noise thresholds) may correspond to a defined environment type. In response to the comparison of the various thresholds and/or the location determined by the location sensor 306, the environment detection module 218 sets the environment type of the environment to a "low-risk environment" (Operation 406), a "medium-risk environment" (Operation 408), or a "high-risk environment" (Operation 410).

Having determined the type of environment where the wearable computing device 104 is located, the input detection module 220 then detects input from the user 120 (Operation 412). As explained above, the user input may be detected by one or more of the sensors 208 and stored as the biometric input data 228. The input detection module 220 may then determine whether user input was voluntary or involuntary. An involuntary user input signifies that the user did not intend to provide input to the wearable computing device 104 that would be interpreted as a command, whereas the voluntary user input signifies that the user did intend to provide input that would be interpreted as a command.

In one embodiment, the input detection module 220 determines whether the user provided input was voluntary or involuntary by comparing the biometric input data 228 obtained by the EEG sensor 316 with one or more previously calibrated readiness potential values and/or one or more previously calibrated event-related potential values for the user 120 (Operation 414). Where the biometric input data 228 does not approximate any one of the one or more potential measurements (e.g., the readiness potential measurements and/or event-related potential measurements) previously obtained (e.g., within a predetermined degree of tolerance), the input detection module 220 determines that the user input was an involuntary input (e.g., the "INVOLUNTARY" branch of Operation 414). Where the user input is determined to be involuntary, the input detection module 220 ignores the provided user input (Operation 416).

In contrast, where the biometric input data 228 approximates any one of the one or more measurements previously obtained (e.g., within the predetermined degree of tolerance), the input detection module 220 determines that the user input was voluntary (e.g., the "VOLUNTARY" branch of Operation 414). Referring to FIG. 4B, the input detection module 220 then evaluates the provided user input (e.g., the biometric input data 228) by classifying the provided user input into one or more categories. Each category is assigned a value, which are discussed below with reference to FIG. 5. As discussed above, the values of the various categories may be stored on the wearable computing device 104 as the biometric intention data 230 and/or accessible by the wearable computing device 104 via the communication interface 206. The input detection module 220 then evaluates the assigned values to determine a biometric input score 232 (Operation 418).

The input detection module 220 uses the biometric input score 232 to determine whether provided user input should be interpreted as a command or ignored. In one embodiment, the biometric input score 232 is compared with the environment risk value corresponding to the environment type determined by the environment detection module 218 (Operation 420). Where the input detection module 220 determines that the biometric input score 232 is equal to or greater than the environment risk value (e.g., "YES" branch of Operation 422), the input detection module 220 ignores the provided user input. Alternatively, where the input detection module 220 determines that the biometric input is less than the environment risk value (e.g., "NO" branch of Operation 420), the input detection module 220 determines that the user provided input should be interpreted as a command by the wearable computing device 104. Accordingly, in one embodiment, the input detection module 220 instructs the AR application 216 to determine and/or interpret a command to be performed from the biometric input data 228 (Operation 424). The AR application 216 then performs the determined command (Operation 426).

Figure 5:
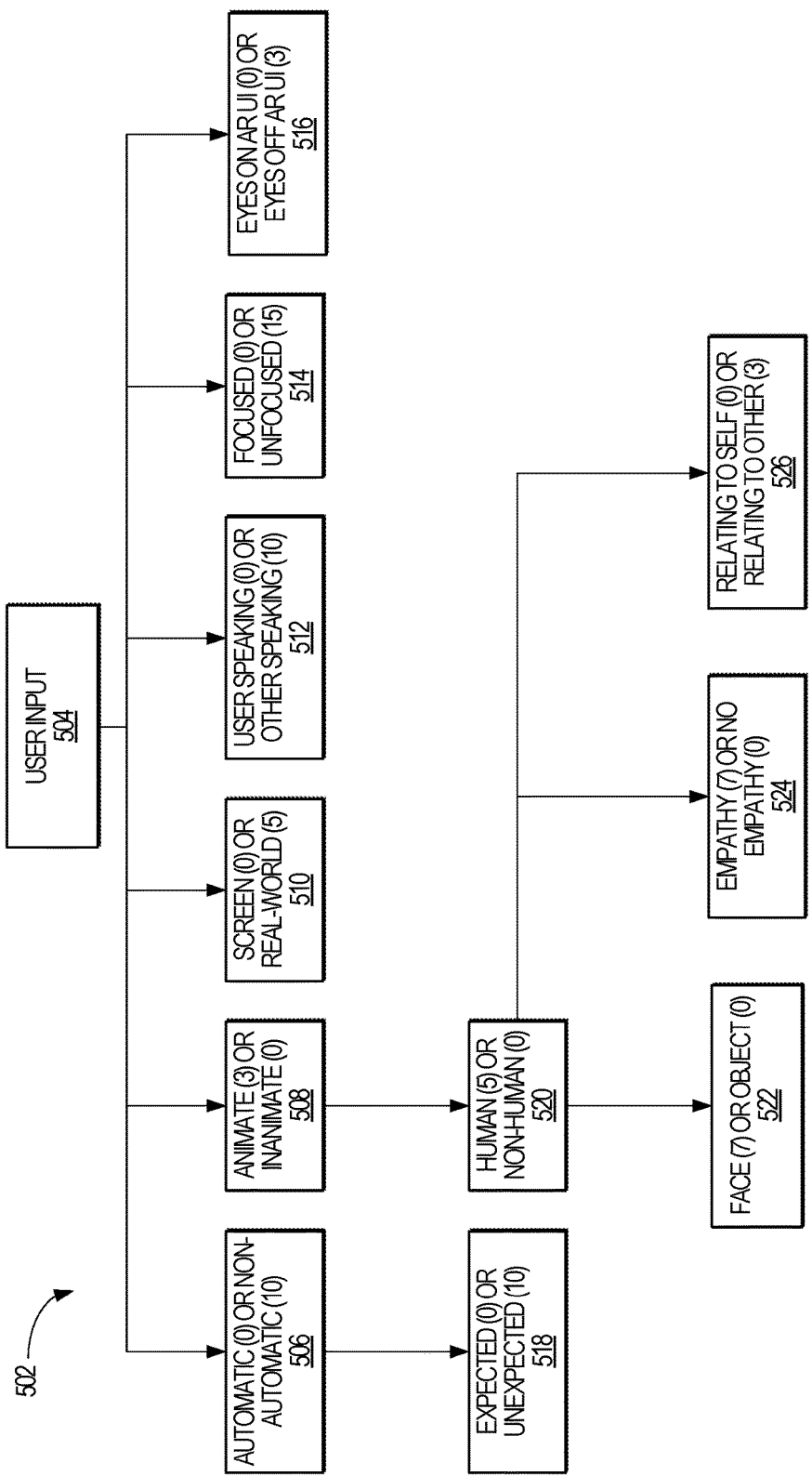
FIG. 5 illustrates a user input classifying tree, according to an example embodiment, used by the wearable computing device of FIG. 1 in determining a biometric input score for a given user input.

FIG. 5 illustrates a user input classifying tree 502, according to an example embodiment, used by the wearable computing device of FIG. 1 in determining a biometric input score 232 from the biometric input data 228. In one embodiment, the user input classifying tree 502 is stored as part of the biometric intention data 230. The input detection module 220 references the user input classifying tree 502 in classifying the biometric input data 228 and assigning values to the classified biometric input data.

As shown in FIG. 5, the user input classifying tree 502 includes several different categories 506-526 for classifying the user input 504 (e.g., the biometric input data 228). In general, a category 506-526 defines a characteristic of the biometric input data 228. In one embodiment, the input detection module 220 classifies the biometric input data 228 using one or more of the classification techniques as previously discussed. Once classified, the input detection module 220 assigns a classification value for the corresponding category in which the biometric input data 228 has been classified. Table 1, below, lists the various categories into which the biometric input data 228 may be classified, a brief description of each category, and an example of a classification value that may be assigned to a corresponding category.

TABLE 1

| Ref. No. | Category | Brief Description | Classification Value |
|---|---|---|---|
| 506 | Automatic | Indicates that the biometric input provided by the user was an automatic response | 0 |
| 508 | Non-automatic | Indicates that the biometric input provided by the user was intentionally controlled by the user | 10 |
| 518 | Expected | Indicates that the biometric input was expected from the user | 0 |
| 518 | Unexpected | Indicates that the biometric was not expected from the user | 10 |
| 508 | Animate | Indicates that the user was looking at an animate object | 3 |
| 508 | Inanimate | Indicates that the user was looking at an inanimate object | 0 |
| 520 | Human | Indicates that the object being viewed by the user is human | 5 |
| 520 | Non-human | Indicates that the object viewed by the user is not human | 0 |
| 522 | Face | Indicates that the user was looking at a human face | 7 |
| 522 | Object | Indicates that the user was looking at an object (e.g., other than a human face) | 0 |
| 524 | Empathy | Indicates that the user understands and shares the feelings of a target entity | 7 |
| 524 | No Empathy | Indicates that the user does not share with the feelings of a target entity. | 0 |
| 526 | Relating to Self | Indicates that the user is introspecting in some way (e.g., not communicating with other entities; thinking about the self, etc.) | 0 |
| 526 | Relating to Other | Indicates that the user is not introspecting, but interacting with the outside world in some way. | 3 |
| 510 | Screen | Indicates that the user was looking at the display 204 of the wearable computing device 104 | 0 |
| 510 | Real-world | Indicates that the user was looking at his or her environment | 5 |
| 512 | User Speaking | Indicates that the user was speaking at the time the biometric input was received | 0 |

TABLE 1-continued

| Ref. No. | Category | Brief Description | Classification Value |
|---|---|---|---|
| 512 | Other Speaking | Indicates that a person other than the user was speaking at the time the biometric input data was received. | 10 |
| 514 | Focused | Indicates that the user's eyes were focused on a particular object | 0 |
| 514 | Unfocused | Indicates that the user's eyes were not focused on a particular object | 15 |
| 516 | Eyes On AR UI | Indicates that the user's eyes were looking at a user interface provided by the AR application 216 | 0 |
| 516 | Eyes Off AR UI | Indicates that the user's eyes were looking at an object other than the user interface provided by the AR application 216 | 3 |

Although Table 1 demonstrates that the biometric input data 228 may be classified into 22 different categories, the input detection module 220 may classify the biometric input data 228 into fewer categories or selected categories. Thus, in some instances, not every category will be used in classifying the biometric input data 228. As one of ordinary skill in the art will appreciate, the biometric input data 228 may be classified into a variety of categories, depending on the type of biometric input data received.

The input detection module 220 determines the biometric input score 232 according to the classification values associated with the classified biometric input data. In one embodiment, this process is additive, where the summation of the classification values yields the biometric input score 232. As one example, suppose that the user 120 waves to another person while wearing the wearable computing device 104. In this example, the input detection module 220 determines that: the gesture (e.g., the waving) is voluntary, that the user is looking at an animate object (e.g., a classification value of 3), that the animate object is human (e.g., a classification value of 5), and that the user 120 is looking at a face of the animate object (e.g., a classification value of 7). Where the biometric input score 232 is a summation of the classification values, the input detection module 220 determines that the biometric input score 232 for this particular interaction is 15 (e.g., 3+5+7). This determined biometric input score 232 is then compared with the environment risk value determined by the environment detection module 218. As discussed above, depending on the results of the comparison, the input detection module 220 ignores the provided input or allows the biometric input data 228 to be interpreted as a command by the AR application 216.

In this manner, the wearable computing device 104 is configured to determine whether given biometric inputs from a user 120 should be interpreted as a command to be performed by the AR application 216 and/or the wearable computing computer device 104, or whether such inputs should be ignored given the environment in which the wearable computing device 104 is located. As some environments are inherently more active than others, it is understandable that the user 120 may engage in some actions, gestures, and/or movements that are not intended to be inputs to the wearable computing device 104. Subsequently, this improvement also results in better performance in the wearable computing device 104 as the wearable computing device 104 is prevented from performing otherwise undesired commands and/operations, which saves on computing resources available to the wearable computing device 104. Thus, the subject matter of this disclosure provides a technical solution to a technical problem that arises when a wearable computing device 104 is configured to accept commands via biometric input.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 6:
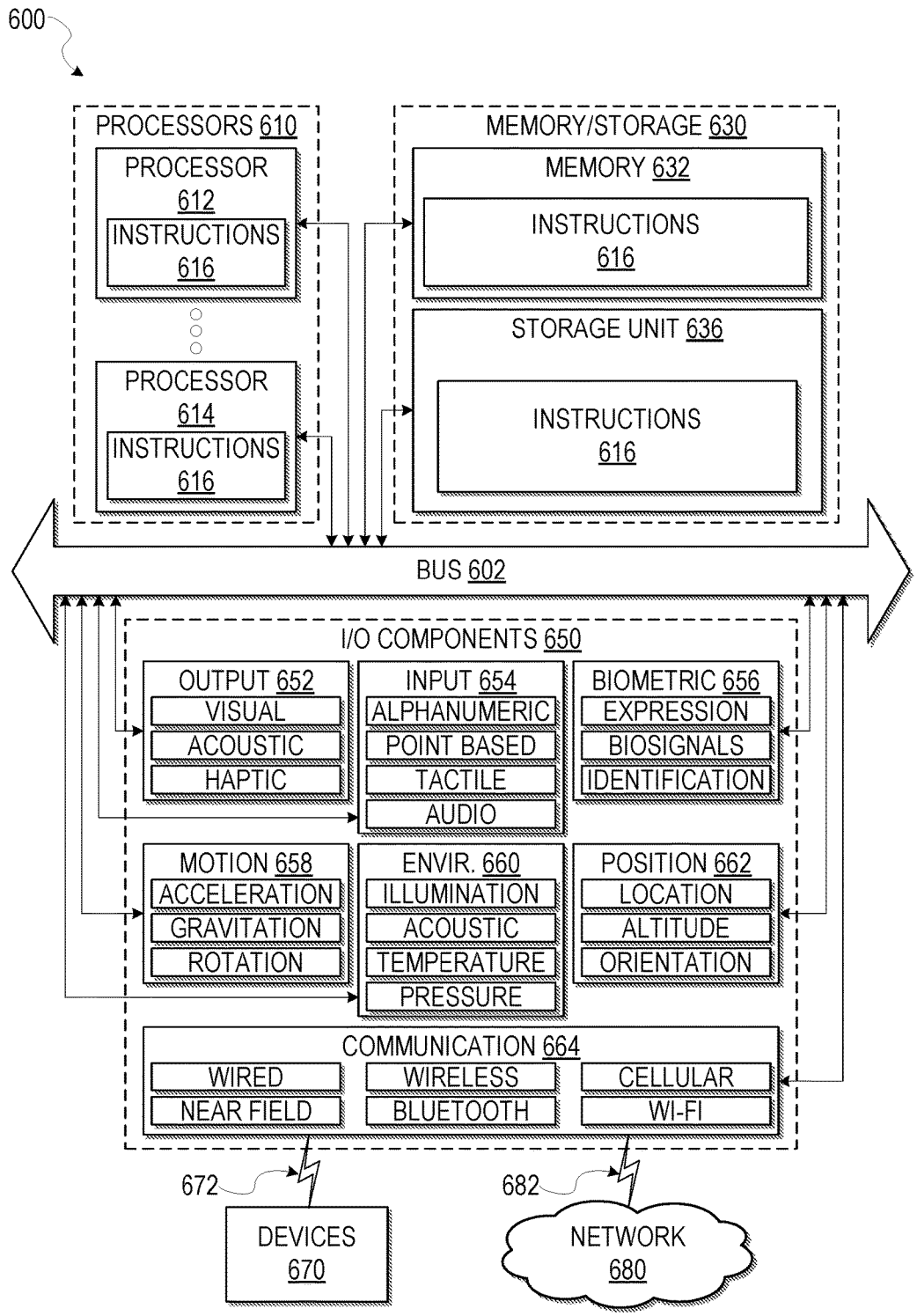
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions may cause the machine to execute the method illustrated in FIGS. 4A-4B. Additionally, or alternatively, the instructions may implement one or more of the modules 212 illustrated in FIG. 2 and so forth. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A wearable computing device for providing augmented reality images of an environment in which the wearable computing device is worn, the wearable computing device comprising: a machine-readable memory storing computer-executable instructions; and at least one hardware processor in communication with the machine-readable memory that, when the computer-executable instructions are executed, configures the wearable computing device to perform a plurality of operations, the plurality of operations comprising: determining an environment type for an environment in which the wearable computing device is located, the environment type associated with an environment risk value; obtaining a plurality of biometric measurements from one or more biometric sensors communicatively coupled to the wearable computing device; classifying the plurality of biometric measurements into a plurality of categories, at least one category defining a characteristic of the obtained biometric measurements; determining a biometric input score based on the at least one category; comparing the determined biometric input score with the associated environment risk value; and in response to the comparison of the determined biometric input score and the associated environment risk value, identifying the plurality of biometric measurements as a false input to the wearable computing device.

2. The system of claim 1, wherein the plurality of operations further comprise:
determining a readiness potential from the plurality of biometric measurements;
comparing the determined readiness potential with a previously measured baseline readiness potential; and
in response to the comparison of the determined readiness potential with the previously measured baseline readiness potential, determining that the plurality of biometric measurements were from voluntary movements of a user of the wearable computing device.

3. The system of claim 1, wherein the environment type is determined by cross-referencing Global Positioning System (GPS) coordinates with a location associated with the environment type.

4. The system of claim 1, wherein determining the environment type comprises:
activating at least one external camera to detect a plurality of objects;
activating at least one audio sensor to detect one or more sounds;
comparing the detected plurality of objects with at least one object threshold and the detected one or more sounds with at least one noise threshold; and
in response to the comparisons with the at least one object threshold and the at least one noise threshold, determining the environment type.

5. The system of claim 1, wherein each category of the plurality of categories is associated with a classification value, and the biometric input score is determined from the classification values associated with the plurality of categories.

6. The system of claim 1, wherein the plurality of operations further comprise:
determining whether the plurality of biometric measurements were the result of voluntary or involuntary movements by a user of the wearable computing device; and
in response to a determination that the plurality of biometric measurements were the result of voluntary movements, performing the classifying of the plurality biometric measurements into the plurality of categories.

7. The system of claim 1, wherein the plurality of operations further comprise:
identifying the plurality of biometric measurements as an input to be interpreted as a command performable by the wearable computing device in response to the comparison of the determined biometric input score and the associated environment risk value.

8. A method for providing augmented reality images of an environment in which a wearable computing device is worn, the method comprising: determining, by at least one hardware processor, an environment type for an environment in which the wearable computing device is located, the environment type associated with an environment risk value; obtaining, by one or more biometric sensors communicatively coupled to the wearable computing device, a plurality of biometric measurements; classifying the plurality of biometric measurements into a plurality of categories, at least one category defining a characteristic of the obtained biometric measurements; determining a biometric input score based on the at least one category; comparing the determined biometric input score with the associated environment risk value; and in response to the comparison of the determined biometric input score and the associated environment risk value, identifying the plurality of biometric measurements as a false input to the wearable computing device.

9. The method of claim 8, further comprising:
determining a readiness potential from the plurality of biometric measurements;
comparing the determined readiness potential with a previously measured baseline readiness potential; and
in response to the comparison of the determined readiness potential with the previously measured baseline readiness potential, determining that the plurality of biometric measurements were from voluntary movements of a user of the wearable computing device.

10. The method of claim 8, wherein the environment type is determined by cross-referencing Global Positioning System (GPS) coordinates with a location associated with the environment type.

11. The method of claim 8, wherein determining the environment type comprises:
activating at least one external camera to detect a plurality of objects;

activating at least one audio sensor to detect one or more sounds;

comparing the detected plurality of objects with at least one object threshold and the detected one or more sounds with at least one noise threshold; and in response to the comparisons with the at least one object threshold and the at least one noise threshold, determining the environment type.

12. The method of claim 8, wherein each category of the plurality of categories is associated with a classification value, and the biometric input score is determined from the classification values associated with the plurality of categories.

13. The method of claim 8, further comprising:

determining whether the plurality of biometric measurements were the result of voluntary or involuntary movements by a user of the wearable computing device; and in response to a determination that the plurality of biometric measurements were the result of voluntary movements, performing the classifying of the plurality biometric measurements into the plurality of categories.

14. The method of claim 8, further comprising:

identifying the plurality of biometric measurements as an input to be interpreted as a command performable by the wearable computing device in response to the comparison of the determined biometric input score and the associated environment risk value.

15. A machine-readable memory storing computer-executable instructions that, when executed by at least one hardware processor in communication with the machine-readable memory, configures a wearable computing device to perform a plurality of operations, the plurality of operations comprising: determining an environment type for an environment in which the wearable computing device is located, the environment type associated with an environment risk value; obtaining a plurality of biometric measurements from one or more biometric sensors communicatively coupled to the wearable computing device; classifying the plurality of biometric measurements into a plurality of categories, at least one category defining a characteristic of the obtained biometric measurements; determining a biometric input score based on the at least one category; comparing the determined biometric input score with the associated environment risk value; and in response to the comparison of the determined biometric input score and the associated environment risk value, identifying the plurality of biometric measurements as a false input to the wearable computing device.

16. The machine-readable memory of claim 15, wherein the plurality of operations further comprise:

determining a readiness potential from the plurality of biometric measurements;

comparing the determined readiness potential with a previously measured baseline readiness potential; and in response to the comparison of the determined readiness potential with the previously measured baseline readiness potential, determining that the plurality of biometric measurements were from voluntary movements of a user of the wearable computing device.

17. The machine-readable memory of claim 15, wherein the environment type is determined by cross-referencing Global Positioning System (GPS) coordinates with a location associated with the environment type.

18. The machine-readable memory of claim 15, wherein determining the environment type comprises:

activating at least one external camera to detect a plurality of objects;

activating at least one audio sensor to detect one or more sounds;

comparing the detected plurality of objects with at least one object threshold and the detected one or more sounds with at least one noise threshold; and in response to the comparisons with the at least one object threshold and the at least one noise threshold, determining the environment type.

19. The machine-readable memory of claim 15, wherein each category of the plurality of categories is associated with a classification value, and the biometric input score is determined from the classification values associated with the plurality of categories.

20. The machine-readable memory of claim 15, wherein the plurality of operations further comprise:

determining whether the plurality of biometric measurements were the result of voluntary or involuntary movements by a user of the wearable computing device; and in response to a determination that the plurality of biometric measurements were the result of voluntary movements, performing the classifying of the plurality biometric measurements into the plurality of categories.

* * * * *